US011808567B1

(12) United States Patent
Toman (10) Patent No.: US 11,808,567 B1
(45) Date of Patent: Nov. 7, 2023

(54) SYSTEM AND METHOD FOR DETECTING SPAN ALIGNMENT WITHIN A MECHANIZED IRRIGATION SYSTEM

(71) Applicant: Valmont Industries, Inc., Omaha, NE (US)

(72) Inventor: Benjamin J. Toman, Omaha, NE (US)

(73) Assignee: Valmont Industries, Inc., Omaha, NE (US)

( * ) Notice: Subject to any disclaimer, the term of this patent is extended or adjusted under 35 U.S.C. 154(b) by 345 days.

(21) Appl. No.: 17/183,428

(22) Filed: Feb. 24, 2021

Related U.S. Application Data (60) Provisional application No. 62/982,813, filed on Feb. 28, 2020.

(51) Int. Cl.
*G01B 7/31* (2006.01)
*A01G 25/09* (2006.01)

(52) U.S. Cl.
CPC ............. *G01B 7/31* (2013.01); *A01G 25/092* (2013.01)

(58) Field of Classification Search
CPC ........... G05B 2219/33331; G05B 2219/25428; G05B 19/4183; G05B 2219/37434; G05B 23/024; G05B 2219/37351; G05B 23/0297; G05B 23/02; G05B 23/0283; G06F 17/18; G06F 11/3409; G01H 1/003; G01H 17/00; G01H 3/08; G01B 7/31; A01G 25/092
See application file for complete search history.

(56) References Cited

U.S. PATENT DOCUMENTS

| 6,007,004 | A | * | 12/1999 | Unruh | A01G 25/092 239/731 |
| 6,036,121 | A | * | 3/2000 | Gerdes | A01G 25/162 239/11 |
| 7,229,032 | B1 | * | 6/2007 | Christensen | A01G 25/092 239/744 |
| 8,757,302 | B2 | * | 6/2014 | Korus | B62D 55/06 180/9.1 |
| 8,931,719 | B2 | * | 1/2015 | Toman | A01G 25/092 239/735 |
| 9,661,808 | B2 | * | 5/2017 | Abts | A01G 25/092 |
| 10,517,237 | B2 | * | 12/2019 | Miller | A01M 7/0089 |
| 10,582,671 | B2 | * | 3/2020 | Abts | A01G 25/092 |

* cited by examiner

*Primary Examiner* — Vinh P Nguyen
(74) *Attorney, Agent, or Firm* — Milligan PC LLO (57) ABSTRACT

A string potentiometer attached between spans of an irrigation system. The string potentiometer is mounted on a first span with the measuring cable of the string potentiometer wrapped around a hitch socket or another structural element of an adjacent span. When the two spans move out of alignment, the measuring cable extends out from the potentiometer to wrap around the hitch socket or other structural element of the adjacent span. When the two spans move closer into alignment, the measuring cable retracts within the potentiometer and unwraps from around the hitch socket or other element of the adjacent span.

12 Claims, 8 Drawing Sheets

Span Underside View

SYSTEM AND METHOD FOR DETECTING SPAN ALIGNMENT WITHIN A MECHANIZED IRRIGATION SYSTEM

RELATED APPLICATIONS

The present application claims priority to U.S. Provisional Application No. 62/982,813 filed Feb. 28, 2020.

BACKGROUND AND FIELD OF THE PRESENT INVENTION

Field of the Present Invention

The present invention relates generally to a system and method for alignment control of irrigation spans and, more particularly, to a system and method for detecting span alignment within a mechanized irrigation system.

Background of the Invention

Modern center pivot and linear irrigation systems generally include interconnected spans (e.g., irrigation spans) supported by one or more tower structures to support the conduits (e.g., water pipe sections). In turn, the conduits are further attached to sprinkler/nozzle systems which spray water (or other applicants) in desired patterns. In these modern irrigation systems, a significant number of powered elements are used to control various aspects of irrigation. In operation, control and powering of each of these powered elements is accomplished via systems of electro-mechanical devices including relays, switches and other devices with moving parts.

At present, a particular challenge for machine operators is the precise detection and control of the angles between spans. A primary method for measuring the relative angles between spans includes the use of electromechanical angle sensors such as rotary position sensors, tilt angle sensors and the like. However, these types of sensors are often expensive, unreliable and imprecise. Additionally, these types of sensors often have difficulty measuring larger span angles.

To overcome the limitations of the prior art, a reliable and effective system is needed to precisely measure larger span angles.

SUMMARY OF THE PRESENT INVENTION

To address the shortcomings presented in the prior art, the present invention provides a system and method for accurately sensing large (or small) angles of alignment between adjacent spans of an irrigation system, such as a center pivot, linear, or pivot with corner.

According to a preferred embodiment, the present invention includes the use of a string potentiometer attached between spans of an irrigation system. According to a preferred embodiment, the string potentiometer is preferably mounted on a first span with the measuring cable of the string potentiometer wrapped around a hitch socket or another structural element of an adjacent span. When the two spans are in good alignment, the measuring cable will preferably remain taut and retracted to a first length. When the two spans move further out of alignment, the measuring cable will preferably extend out from the potentiometer to wrap around the hitch socket (or another element). When the two span move closer into alignment, the measuring cable will preferably retract within the potentiometer and unwrap from around the hitch socket. According to further preferred embodiments, movement of the measuring cable (i.e. extension or retraction), will preferably result in a millivolt signal change that can be used in conjunction with a programmable logic controller to trigger various system functions including but not limited to motor control, booster pump/end gun control, and breaking of the system safety circuit.

Accordingly, the present invention allows reliable and precise sensing of angles in the range of 0° to 360°. Further, the present invention allows a high degree of precision in angular measurements over the entire sensing range.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

Figure 1:
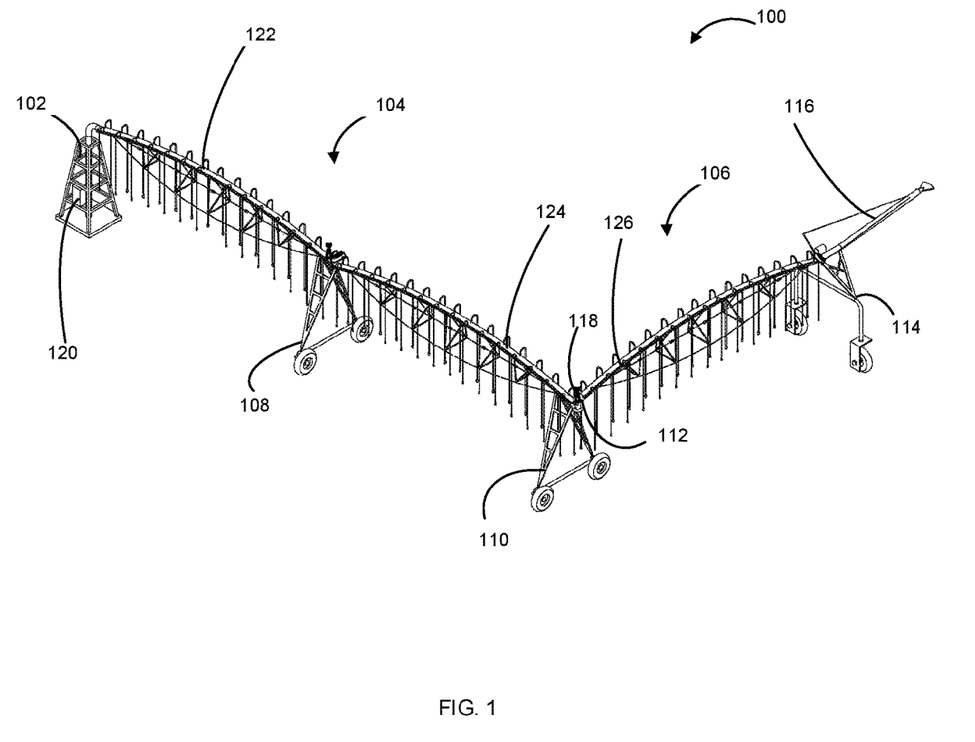
FIG. 1 shows an exemplary irrigation system for use with the present invention.

FIG. 1 illustrates an exemplary self-propelled irrigation system 100 which may be used with example implementations of the present invention. As should be understood, the irrigation system 100 disclosed in FIG. 1 is an exemplary irrigation system onto which the features of the present invention may be integrated. Accordingly, FIG. 1 is intended to be illustrative and any of a variety of systems (i.e. fixed systems as well as linear, and/or center pivot self-propelled irrigation systems and corner systems) may be used with the present invention without limitation.

With reference now to FIG. 1, an exemplary irrigation machine 100 of the present invention preferably may include a main span arm 104, a center pivot structure 102 and supporting drive towers 108, 110. The main span arm 104 may preferably include one or more individual spans 122, 124. The exemplary irrigation machine 100 may also include a corner span arm 106, which may include one or more spans 126 attached at a connection point 112. The corner span 106 may be supported and moved by a steerable drive unit 114. The corner span 106 may include a boom 116 and an end gun (not shown) and/or other sprayers. Additionally, a position sensor 118 may provide positional and angular orientation data for the system as discussed further below. Further, a central control panel 120 is provided for enclosing on-board computer elements. The control panel 120 may also be linked to a transceiver for transmitting and receiving data between system elements.

Figure 2:
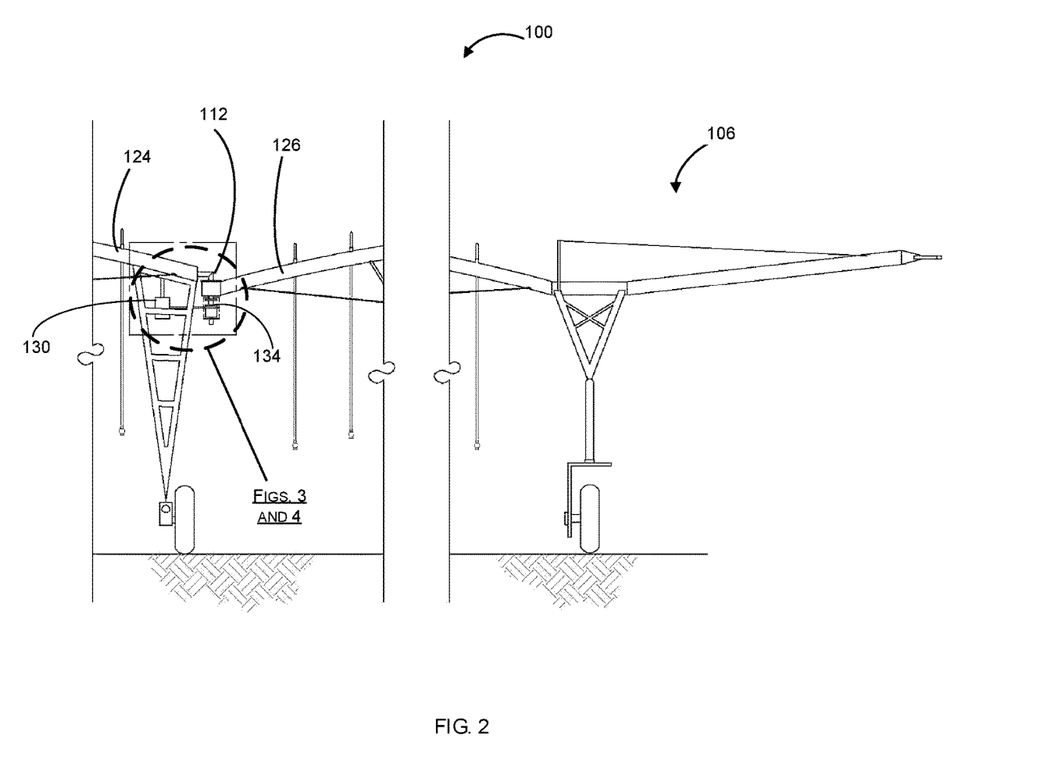
FIG. 2 shows an exemplary position sensor of the present invention in accordance with a first preferred embodiment of the present invention with the irrigation span in a straight configuration.

With reference now to FIG. 2, a side view of a portion of the irrigation system 100 is provided. In the view shown, a main arm span 124 is connected to a corner span 106 at a first connection point 112. A string potentiometer 130 of the present invention is shown connected at a first point to the main arm span 124. Additionally, a corner arm spool 134 is shown connected to the corner arm span 126. For the purposes of illustration, in FIG. 2 the main span 124 and the corner span 126 are shown in a straight, linearly aligned configuration.

Figure 3:
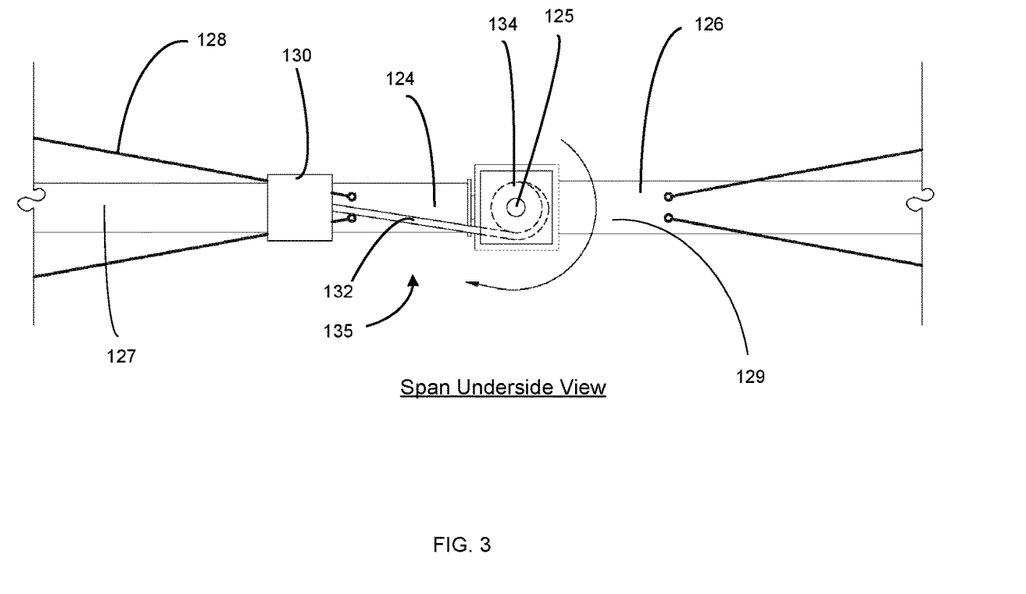
FIG. 3 shows an enlarged view of the exemplary position sensor shown in FIG. 2.
Figure 4:
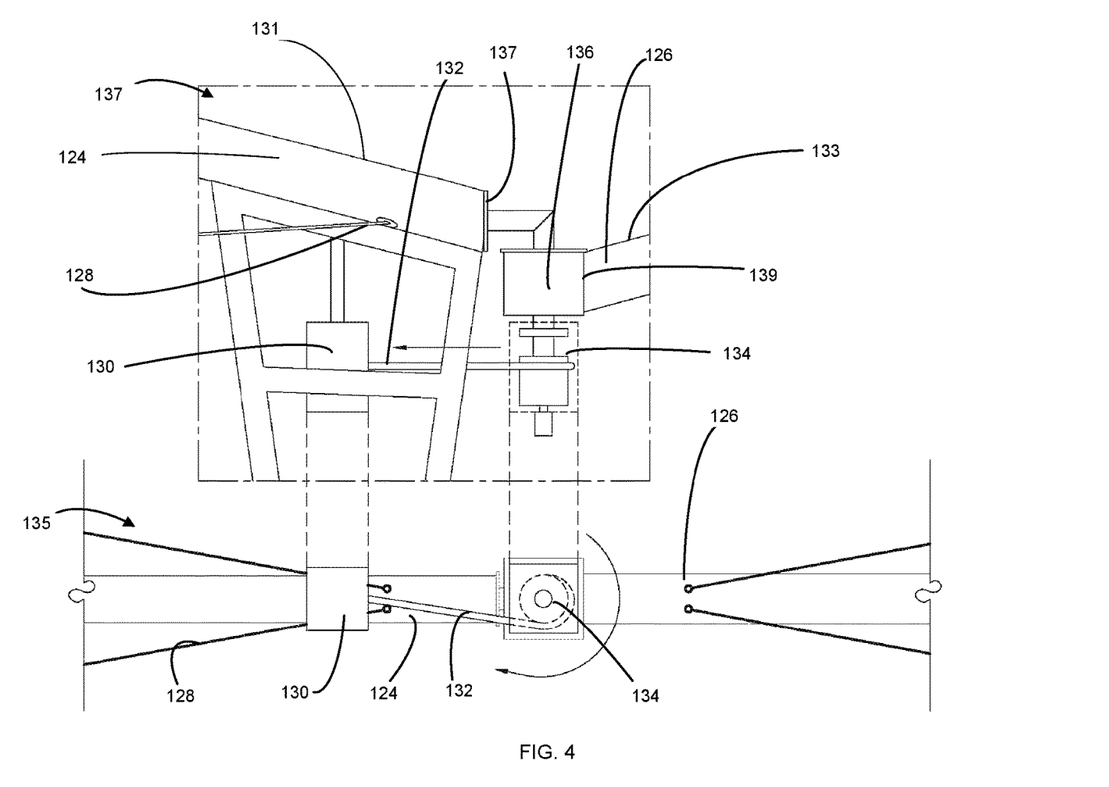
FIG. 4 shows a multi-view drawing which shows the underside view of the exemplary position sensor shown in FIG. 3 orthogonally projected and aligned with an elevation view of the connection point area.

With reference now to FIGS. 3 and 4, enlarged views of the connection point 112 area shown in FIG. 2 is provided. With reference to FIG. 3, an underside view of the main span 124 connected to the corner span 126 is provided. As shown, the individual spans 124, 126 are supported with a variety of truss rods 128. With respect to the present invention, a potentiometer 130 is provided and arranged to measure the relative angle between the two spans 124, 126. According to a preferred embodiment, the potentiometer 130 is preferably a string potentiometer although other designs may also be used. As further shown, the corner arm spool 134 is shown attached to the corner arm span 126. Preferably, the corner arm spool 134 includes an internal spring (not shown) which biases the corner arm spool 124 to apply a continual retracting/pulling force to the measuring cable 132. The retracting/pulling force of the corner arm spool 134 is preferably less than the retraction/pulling force of the potentiometer 130 as discussed further below.

With reference now to FIG. 4, a multi-view drawing is provided which includes the underside view 135 of FIG. 3 orthogonally projected and aligned with an elevation view 137 of the connection point 112 area. As shown in FIG. 4, the string potentiometer 130 may preferably be attached to the underside of the main span 124. Alternatively, the string potentiometer 130 and/or the corner arm spool 134 may be attached to the top or side surfaces of each respective span 124, 126.

As further shown in FIG. 3, the string potentiometer 130 is preferably mounted on a first span 124 with the measuring cable of the string potentiometer 130 wrapped around a hitch socket 125 or another structural element of an adjacent span which may preferably be a corner span 126 or the like as shown. As shown in FIGS. 3 and 4, the string potentiometer 130 may preferably be mounted to a bottom surface 127 of the first span 124 with the corner arm spool 134 attached to the bottom surface 129 of the second/corner span 126. According to alternative embodiments, the string potentiometer 130 may also be attached to a first top surface 131 of the first span 124, and the corner arm spool 134 may be attached to a first top surface 133 of the second/corner span 126. According to a further alternative embodiment, the string potentiometer 130 may also be attached to a side surface 137 of the first span 124, and the corner arm spool 134 may be attached to a side surface 139 of the second/corner span 126.

As further shown in FIG. 4, the string potentiometer 130 may preferably include a measuring cable 132 which extends out from the string potentiometer 130 and wraps around the corner arm spool 134. The corner arm spool 134 is preferably integrated with and/or connected to the structure of the connection point 112 and/or the corner span 126. According to a preferred embodiment, the rotational motion of the corner span 126 relative to the main span 124 preferably causes the measuring cable 132 to extend out from the string potentiometer 130 and to wrap around the corner arm spool 134. In FIG. 4, the measuring cable 132 is shown in a first retracted position indicating that the spans 124, 126 are parallel to one another.

Figure 5:
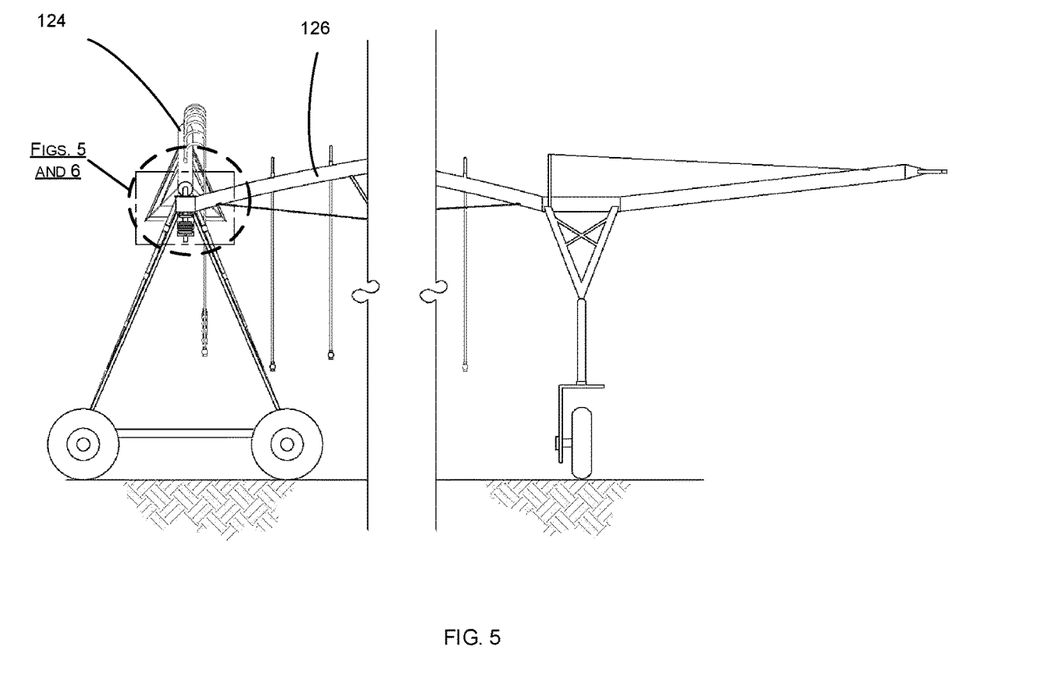
FIG. 5 shows an exemplary position sensor of the present invention in accordance with a first preferred embodiment of the present invention with the corner irrigation span at a ninety-degree angle.
Figure 6:
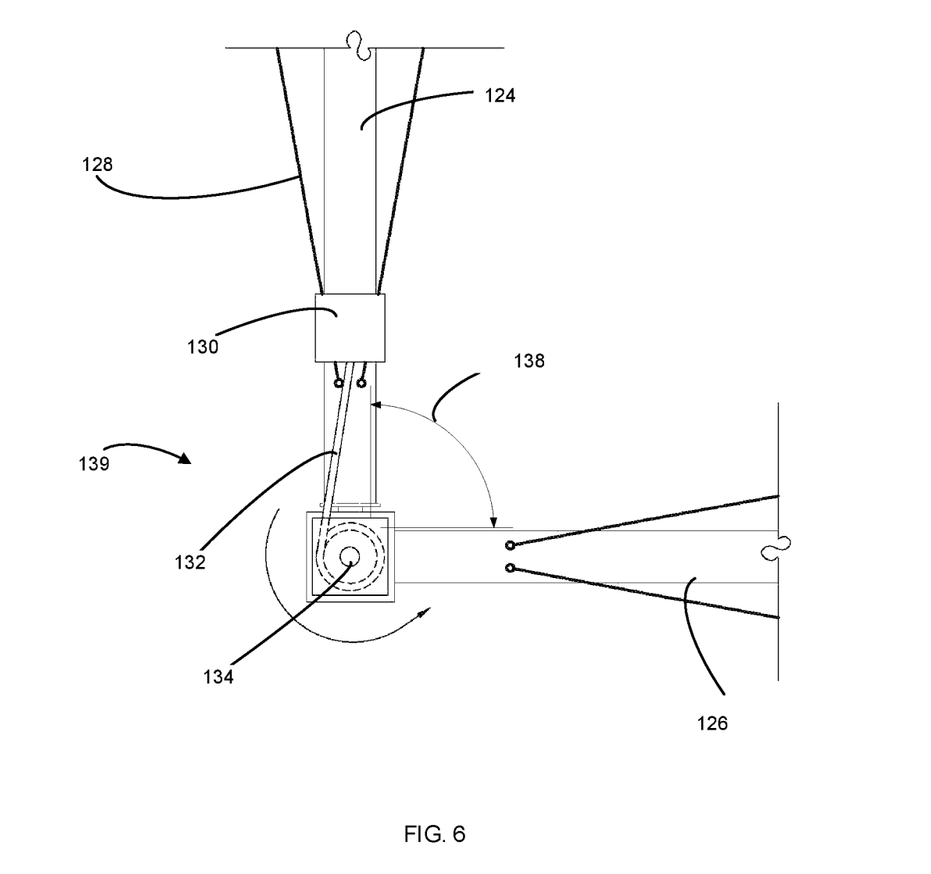
FIG. 6 shows an enlarged view of the exemplary position sensor shown in FIG. 5.

With reference now to FIGS. 5 and 6, the corner arm span 126 is shown rotated 90° with respect to the main span arm 124. As shown in FIG. 6, the measuring cable 132 is preferably pulled and extended from the string potentiometer 130 by the change in the angle 138 between the corner span arm 126 and the main span arm 124. Additionally, the extended length of the measuring cable 132 is wrapped around the corner arm spool 134.

Figure 7:
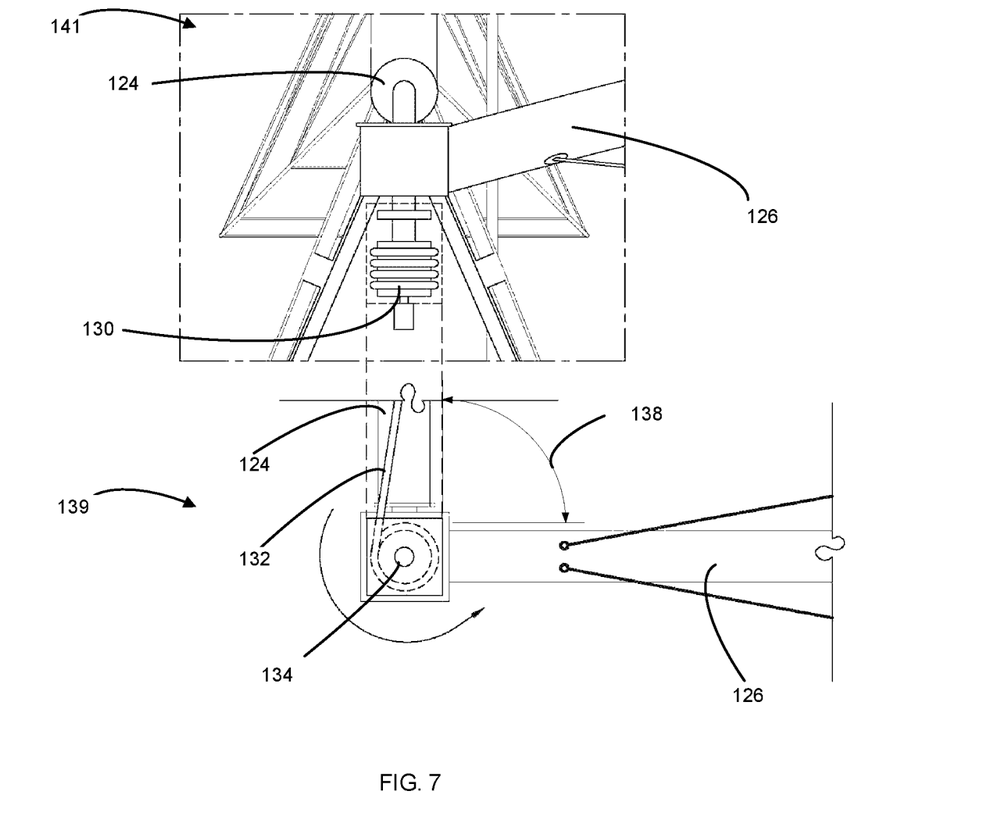
FIG. 7 shows a multi-view drawing which shows the underside view of the exemplary position sensor shown in FIG. 6 orthogonally projected and aligned with an elevation view of the connection point area.

With reference now to FIG. 7, a multi-view drawing is provided which includes the underside view 139 of FIG. 6 orthogonally projected and aligned with an elevation view 141 of the connection point 112 area. As shown in FIG. 7, the measuring cable 132 from the string potentiometer 130 extends out from the string potentiometer 130 in response to any change in the angle 138 between the spans 124, 126. As the measuring cable 132 is pulled out from the string potentiometer 130, the measuring cable 132 preferably winds around the corner arm spool 134 which is preferably integrated with and/or connected to the structure of the connection point 112 and/or the corner span 126. In this way, the measuring cable 132 is preferably held taut between the spans 124, 126 and held away from other moving elements adjacent to the connection point 112.

Figure 8A:
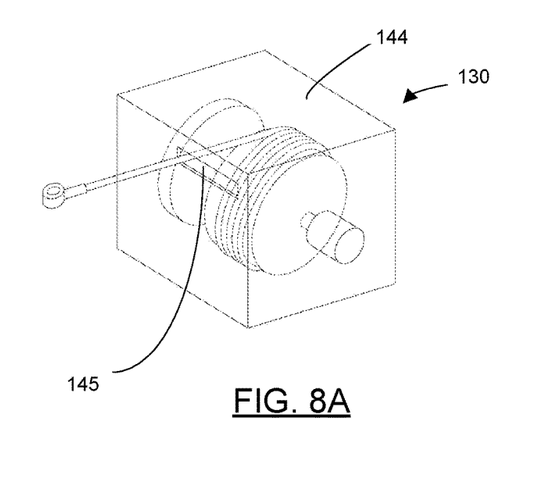
FIGS. 8A and 8B are views illustrating an exemplary string potentiometer for use with the present invention.
Figure 8B:
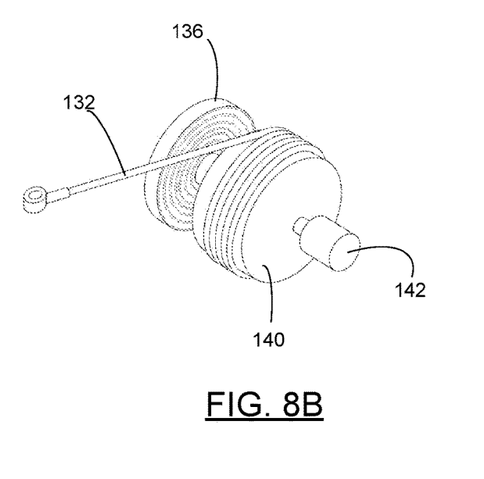

With reference now to FIGS. 8A and 8B, an exemplary string potentiometer 130 for use with the present invention shall now be discussed. As shown, the string potentiometer 130 preferably includes a protective housing 144 having a cable inlet 145 and enclosing an internal spool 140 attached to the measuring cable 132. The measuring cable 132 is preferably formed of stainless steel or another flexible, high strength material. The internal spool 140 is preferably of a sufficient and constant diameter to smoothly wind and unwind the measuring cable 132 as the corner span 126 moves relative to the main span arm 124. The string potentiometer 130 preferably further includes a retracting spring 136 which is preferably a high torque, long-life power spring designed to smoothly retract the measuring cable 132 as the movement between the spans 124, 126 creates slack in the measuring cable 132. In this way, the retracting spring 136 preferably maintains tension on the measuring cable 132. According to a preferred embodiment, the pulling force/tension created by the retracting spring 136 is preferably greater than the tension and pulling force created by the corner arm spool 134.

The string potentiometer 130 preferably further includes a rotational sensor 142 which measures and outputs electrical signals which are proportional to the length which the measuring cable 132 is extended (or its velocity/rate of extension). The internal spool 140 is preferably coupled to the shaft of the rotational sensor 142 which is preferably an encoder, potentiometer or the like. As the measuring cable 132 extends along with the corner span arm 126, the measuring cable 132 causes the internal spool 140 and the sensor shafts to rotate. In this way, the rotational sensor 142 is preferably able to indicate the position of the arm span 126 relative to the main arm span 124. According to preferred aspects of the present invention, the string potentiometer 130 design and implementation of the present invention preferably provides an accurate and repeatable measurement of the relative positions between the spans 124, 126 anywhere in the range from 0° to 360°.

The present invention has been discussed above with reference to a connection between a main arm span and a corner arm span. However, the present invention is not limited to an articulating span being a corner span. The present invention applies to any connection between any two spans. Additionally, the present invention does not require that the potentiometer of the present invention be attached to the articulating span. Instead, the present invention can also function in a similar manner if the potentiometer was mounted on the "second span" and the cable wrapped around a spool on the "first span". Accordingly, the scope of the present invention should be determined not by the embodiments illustrated, but by the appended claims and their legal equivalents.

What is claimed is:

1. An alignment detection system for use with a mechanized irrigation system having a first span and a second span connected at a first connection point, the alignment detection system comprising:
    a measuring cable;
    a string potentiometer, wherein the string potentiometer comprises:
        an internal spool, wherein the internal spool is comprised of a cylinder having a first diameter;
        a rotational sensor, wherein the rotational sensor is configured to measure and output electrical signals proportional to the length that the measuring cable is extended;
        a retracting spring, wherein the retracting spring is comprised of a high torque power spring; wherein the retracting spring is configured to apply a retracting force to the measuring cable;
    a string potentiometer housing, wherein the string potentiometer housing encloses the internal spool, the retracting spring, and the string potentiometer; wherein the string potentiometer housing comprises a cable inlet; wherein the string potentiometer housing is attached to the first span;
    a corner arm spool, wherein the corner arm spool is attached to the second span;
    wherein the measuring cable is attached at a first end to the internal spool of the spring potentiometer; wherein the measuring cable is attached at a second end to the corner arm spool; wherein the measuring cable is pulled and extended out from the string potentiometer by any increase in the angle between the second span and the first span; wherein the extended length of the measuring cable is wrapped around the corner arm spool.

2. The system of claim 1, wherein the second span comprises a span type selected from the group of span types comprising: a main span, a corner span, a bender, and a standard span.

3. The system of claim 2, wherein the string potentiometer is attached to a first top surface of the first span, and the corner arm spool is attached to a first top surface of the second span.

4. The system of claim 2, wherein the string potentiometer is attached to a first bottom surface of the first span, and the corner arm spool is attached to a first bottom surface of the second span.

5. The system of claim 4, wherein the corner arm spool is integrated within the structure of the first connection point.

6. The system of claim 5, wherein the first connection point comprises a hitch socket.

7. The system of claim 6, wherein the internal spool comprises a constant diameter.

8. The system of claim 7, wherein the measuring cable of the string potentiometer is wrapped around the hitch socket.

9. The system of claim 8, wherein the rotational sensor is configured to measure and output electrical signals proportional to a rate at which the measuring cable is extended.

10. The system of claim 9, wherein the rotational sensor comprises an encoder.

11. The system of claim 4, wherein the corner arm spool is integrated within the structure of the second span.

12. The system of claim 2, wherein the string potentiometer is attached to a first side surface of the first span, and the corner arm spool is attached to a first side surface of the second span.

* * * * *